United States Patent [19]

Dunn

[11] Patent Number: 4,993,450
[45] Date of Patent: Feb. 19, 1991

[54] COVER FOR OUTSIDE PIPE ASSEMBLY

[76] Inventor: James W. Dunn, P.O. Box 704, Laurel Hill, Fla. 32567

[21] Appl. No.: 470,585

[22] Filed: Jan. 26, 1990

[51] Int. Cl.⁵ .................................... F16L 35/00
[52] U.S. Cl. ............................ 137/382; 137/381; 220/85 P
[58] Field of Search ........... 220/85 P; 137/377, 381, 137/382

[56] References Cited

U.S. PATENT DOCUMENTS

| | | | |
|---|---|---|---|
| 1,326,768 | 12/1919 | Morgan | 137/382 |
| 1,541,801 | 6/1925 | Durning | 137/382 |
| 4,150,686 | 4/1979 | El Sherif et al. | 137/377 |
| 4,248,262 | 2/1981 | Iwanaga | 137/382 |
| 4,301,828 | 11/1981 | Martin, Jr. | 137/381 |
| 4,577,655 | 3/1986 | Carroll | 137/382 |

Primary Examiner—A. Michael Chambers
Attorney, Agent, or Firm—Brady, O'Boyle & Gates

[57] ABSTRACT

A cover for an outside pipe assembly having a molded fiberglass cover portion connected to a molded fiberglass base portion. The base portion is secured to the ground surrounding the pipe assembly, and a layer of insulation is provided on the interior wall surfaces of the base portion and cover portion to thereby prevent damage to the pipe assembly due to freezing or vandalism.

9 Claims, 2 Drawing Sheets

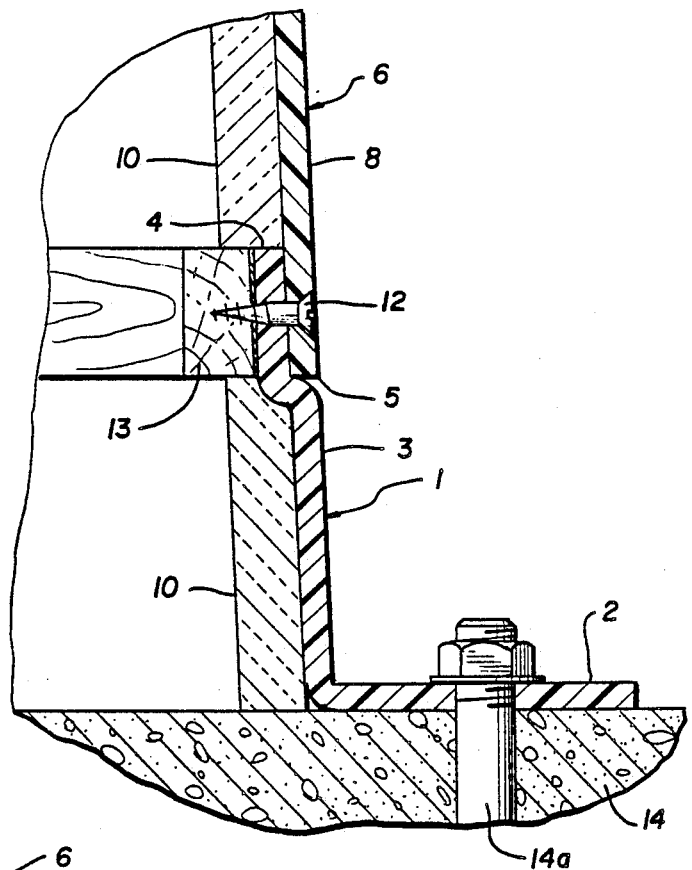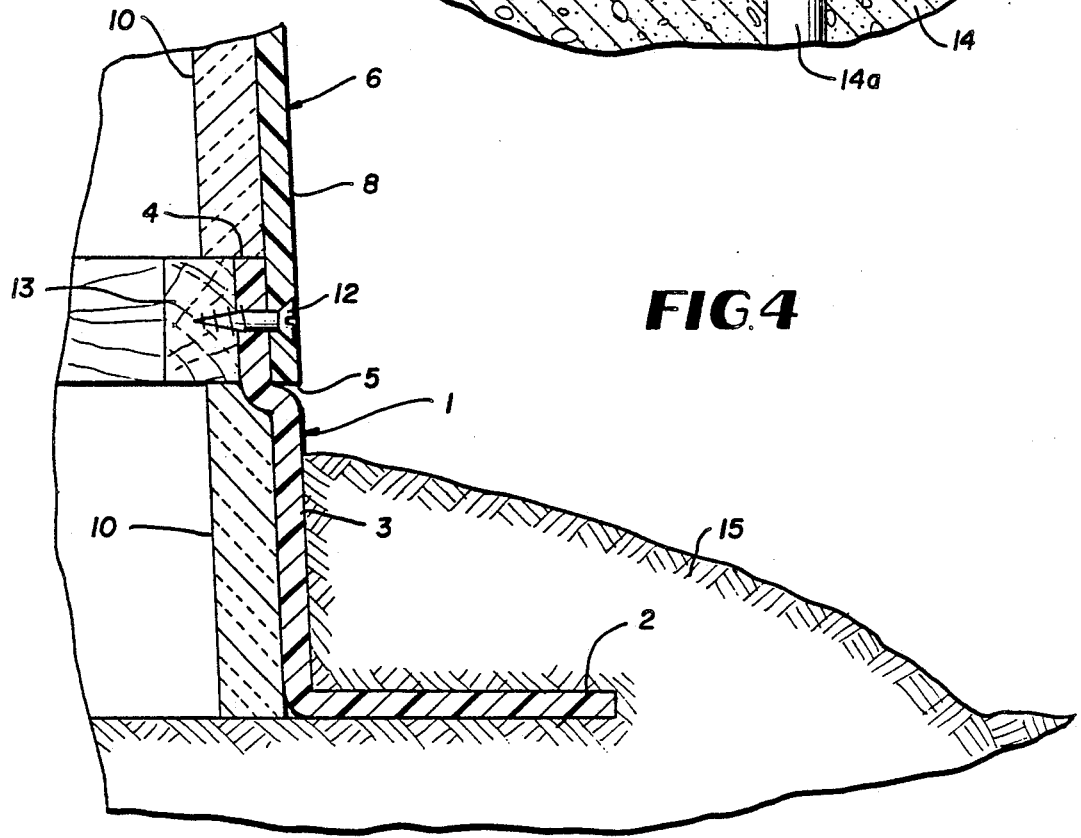

COVER FOR OUTSIDE PIPE ASSEMBLY

BACKGROUND OF THE INVENTION

Various covers or enclosures have been proposed to enclose outside pipe fixtures or assemblies to prevent damage to the pipes due to freezing or vandalism.

Representative covers are disclosed in U.S. Pat. Nos. 3,044,915 dated July 17, 1962; 3,858,632 dated Jan. 7, 1975; 4,380,245 dated Apr. 19, 1983; and 4,726,394 dated Feb. 23, 1988.

After considerable research and experimentation, the cover of the present invention has been devised for not only preventing damage to the outside pipe assembly from freezing or vandalism, but also to enhance the aesthetic appearance to the landscape upon which the pipe assembly is installed. The cost of the cover is minimized since it is of molded plastic construction having slanted walls and radius corners allowing the cover to be easily removed from the molds, and readily stacked for shipment.

The cover of the present invention comprises, essentially, a molded fiberglass base portion having an outwardly extending peripheral flange adapted to be secured to the ground. The upper end of the base portion is open and has an offset peripheral flange adapted to receive the open bottom edge portion of a molded fiberglass cover portion. The interior walls of the base portion and cover portion are provided with a layer of insulation and a wooden strip is secured to the inside wall of the peripheral flange of the base, whereby the cover can be secured to the base by wood screws.

BRIEF DESCRIPTION OF THE DRAWINGS

FIG. 3 is a fragmentary sectional view showing the base portion bolted to a concrete footing; and FIG. 4 is a fragmentary sectional view showing the base portion embedded in the ground.

DESCRIPTION OF THE PREFERRED EMBODIMENT

Figure 1:
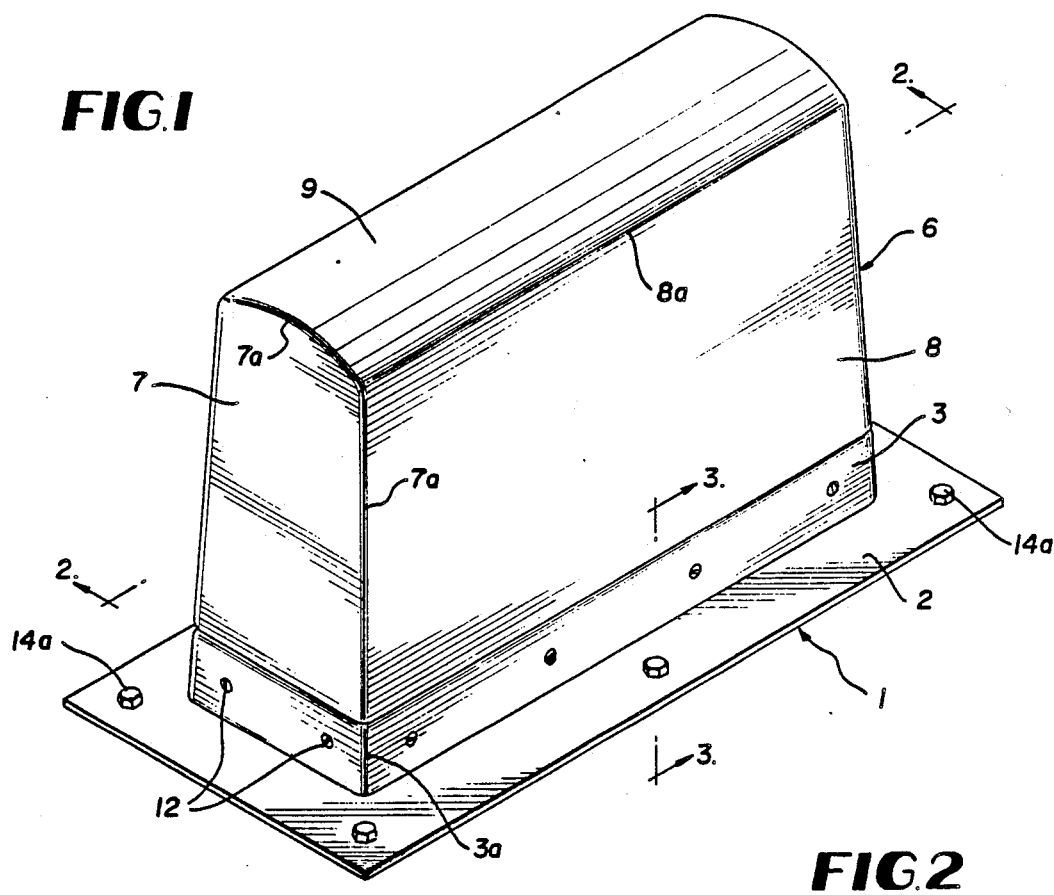
FIG. 1 is a perspective view of the cover of the present invention.
Figure 2:
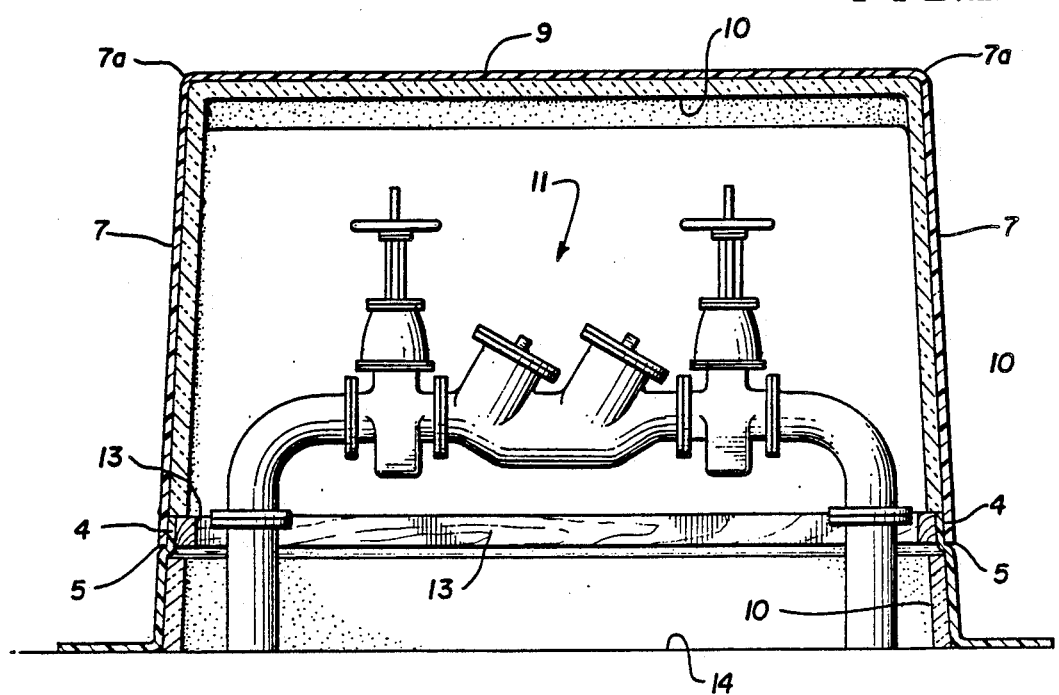
FIG. 2 is a view taken along line 2—2 of FIG. 2.

Referring to the drawings and more particularly to FIGS. 1 and 2, the cover of the present invention comprises a rectangular base portion 1 having an outwardly extending peripheral flange 2 at the lower end thereof and upwardly extending tapered walls 3, the upper end portions of the walls having an offset peripheral flange or shoulder 4 adapted to accommodate the open bottom edge portion 5 of a cover portion 6 having similarly tapered end walls 7 and side walls 8 integral with an arcuate top wall or roof 9.

A layer of insulation 10 is mounted on the interior surfaces of the base walls 3, and cover portion walls 7, 8 and 9.

The cover 6 and associated base 1 are adapted to enclose an outside pipe assembly such as a conventional backflow prevention device 11, as shown in FIG. 2.

Referring to FIGS. 3 and 4, the cover portion 6 is secured to the base portion 1 by a plurality of wood screws 12 extending through the lower edge portions of the cover walls 7 and 8 and the upper edge portions of the base walls 3 and into a strip of wood 13 adhesively secured to the interior surface of each base wall 3 adjacent the shoulder 4.

The base portion 1 can be mounted on the ground, as shown in FIG. 3, by positioning the flange 2 on a concrete footing 14 and securing the flange 2 thereto by suitable anchor bolts 14a.

In lieu of the concrete footing and anchor bolts shown in FIG. 3, the base flange 2 can be embedded or buried in the ground 15 as shown in FIG. 4.

The base portion 1 and cover portion 6 are of molded fiberglass construction and the slanted or tapered walls 3, 7 and 8 and associated radius corners 3a, 7a, 8a not only facilitate the removal of the components from their respective molds but also allow the components to be stacked during shipment. Furthermore, the arcuate top wall 9 and slanted walls 7 and 8 prevent rain water or snow from accumulating on the cover, and the peripheral shoulder 4 on the base portion 1, upon which the bottom edge portion 5 of the cover 6 rests, is dimensioned so that the side walls 3 of the base portion are substantially flush with the end and side walls 7 and 8 of the cover portion 6, to thereby provide smooth flat sides for the placement of suitable indicia such as advertisements, insignias, slogans, and the like.

From the above description, it will be readily apparent to those skilled in the art that the cover of the present invention not only protects outside pipe assemblies from damage due to freezing, vandalism, and the possibility of liability due to injury or accidents caused by the damaged pipe assembly, but also provides an alternative to the appearance of unsightly plumbing fixtures.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A cover for an outside pipe assembly comprising a base portion, an outwardly extending peripheral flange provided on the lower end of said base portion, said base portion having walls extending upwardly from said flange to an open end portion, a peripheral shoulder provided on the walls of said base in proximity to the open end portion thereof, a cover portion having a top wall, and side and end walls depending from said top wall, the lower edges of said side and end walls being seated on the peripheral shoulder on said base portion, fastening means securing the cover portion to the base portion, and means securing the base portion to the ground, said base portion and cover portion enclosing an outside pipe assembly, whereby the pipe assembly is protected from damage due to vandalism.

2. A cover according to claim 1, wherein a layer of insulation is secured to the inner surfaces of the walls of the base portion and cover portion, whereby the pipe assembly is protected from damage due to freezing.

3. A cover according to claim 1, wherein the fastening means comprises a strip of wood secured to the inner surface of the base portion walls adjacent the peripheral shoulder, and wood screws extending through the lower end portion of the cover portion walls and the upper end portion of the base portion walls and into the wood strip.

4. A cover according to claim 1, wherein the base portion and cover portion are constructed of molded fiberglass.

5. A cover according to claim 1, wherein the walls of the base portion, and the side and end walls of the cover portion are tapered with the side walls and end walls of the cover portion being substantially flush with the corresponding walls on the base portion.

6. A cover according to claim 1, wherein the top wall of the cover portion is arcuate to thereby prevent the accumulation of rain water or snow thereon.

7. A cover according to claim 1, wherein the base is supported on a concrete footing, and anchor bolts extend through the base flange into said concrete footing, whereby the cover is secured to the ground.

8. A cover assembly according to claim 1, wherein the flange portion is embedded into the ground, whereby the cover is secured to the ground.

9. A cover for an outside pipe assembly comprising a base portion, an outwardly extending peripheral flange provided on the lower end of said base portion, said base portion having walls extending upwardly from said flange to an open end portion, a peripheral shoulder provided on the walls of said base in proximity to the open end portion thereof, a cover portion having a top wall, and side and end walls depending from said top wall, the lower edges of said side and end walls being seated on the peripheral shoulder on said base portion, a strip of wood secured to the inner surface of the base portion walls adjacent the peripheral shoulder, and wood screws extending through the lower end portion of the cover portion walls and the upper end portion to the base portion, said base portion of the base portion walls and into the wood strip, to thereby secure the cover portion and cover portion enclosing an outside pipe assembly, whereby the pipe assembly is protected from damage due to vandalism.

* * * * *